United States Patent
Zitzmann et al.

(10) Patent No.: US 11,623,819 B2
(45) Date of Patent: Apr. 11, 2023

(54) TRANSFER WITH CONTOUR CHECKING

(71) Applicant: JUNGHEINRICH AKTIENGESELLSCHAFT, Hamburg (DE)

(72) Inventors: Susanne Zitzmann, Munich (DE); John Erkenbrecher, Freising (DE); Ramiro Martinez, Burglengenfeld (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 1137 days.

(21) Appl. No.: 16/304,019

(22) PCT Filed: May 23, 2017

(86) PCT No.: PCT/EP2017/062380
§ 371 (c)(1),
(2) Date: Nov. 21, 2018

(87) PCT Pub. No.: WO2017/202832
PCT Pub. Date: Nov. 30, 2017

(65) Prior Publication Data
US 2020/0317444 A1    Oct. 8, 2020

(30) Foreign Application Priority Data
May 24, 2016    (DE) .................... 10 2016 208 995.1

(51) Int. Cl.
*B65G 1/04*    (2006.01)
*G01B 11/06*    (2006.01)
(Continued)

(52) U.S. Cl.
CPC ........ *B65G 1/0407* (2013.01); *G01B 11/0608* (2013.01); *G01B 11/24* (2013.01);
(Continued)

(58) Field of Classification Search
CPC .......... B65G 1/00; B65G 1/0407; B65G 1/06; B65G 2201/0267; B65G 2203/0225;
(Continued)

(56) References Cited

U.S. PATENT DOCUMENTS 4,540,325 A * 9/1985 Heisler ................ B65G 57/302
414/788.9
4,658,715 A * 4/1987 Stobb ................... B65G 57/035
414/792.9

(Continued)

FOREIGN PATENT DOCUMENTS

DE            119999      5/1976
DE          29519466      5/1996
(Continued)

OTHER PUBLICATIONS

German Application No. DE102016208995.1, Office Action dated Oct. 12, 2021, 6 pages.

(Continued)

*Primary Examiner* — Glenn F Myers
(74) *Attorney, Agent, or Firm* — Kilpatrick Townsend & Stockton LLP

(57) ABSTRACT

The invention relates to an arrangement for checking contours of pallets (18) to be put into storage in a rack system, said arrangement comprising: a pallet transfer station (12) which is designed to receive pallets (18) to be put into storage in the rack system; at least one sensor device (16a-16d) which is designed to detect whether a pallet (18) standing on the pallet transfer station (12) and objects supported by the pallet (18) are completely within a predefined contour; and an output unit (24) which is operationally coupled to the sensor unit (16a-16d) and is designed to output the detection result. The invention also relates to a rack system comprising at least one rack row, at least one stacker crane and at least one arrangement for checking (Continued)

contours, the pallet transfer station of which is designed such that pallets can be placed thereon from outside the rack system, which pallets can then be picked up by the stacker crane so as to be put into storage.

20 Claims, 4 Drawing Sheets

(51) Int. Cl.
*G01B 11/24* (2006.01)
*G01G 19/00* (2006.01)
*G06F 3/14* (2006.01)

(52) U.S. Cl.
CPC ............... *G01G 19/00* (2013.01); *G06F 3/14* (2013.01); *B65G 2201/0267* (2013.01); *B65G 2203/0258* (2013.01); *B65G 2203/041* (2013.01)

(58) Field of Classification Search
CPC .... B65G 2203/0233; B65G 2203/0258; B65G 2203/041; B65G 2203/042; B65G 57/24; B65G 57/245; G01B 11/24; G01B 11/0608; G01B 19/00; Y10S 414/106; Y10S 414/107
USPC ......................................................... 414/289
See application file for complete search history.

(56) References Cited

U.S. PATENT DOCUMENTS

| | | | | |
|---|---|---|---|---|
| 4,787,804 A | * | 11/1988 | Edenas | ..................... B66F 9/07 414/254 |
| 6,422,806 B1 | * | 7/2002 | Jenkins | ................ B65G 57/303 414/794.9 |
| 7,325,667 B1 | * | 2/2008 | Damick | ................. B65G 59/02 198/395 |
| 9,796,540 B1 | * | 10/2017 | Shellenbaum | ....... B25J 15/0014 |
| 2016/0187186 A1 | * | 6/2016 | Coleman | ............... B66F 17/003 177/1 |

FOREIGN PATENT DOCUMENTS

| | | |
|---|---|---|
| DE | 102014111656 | 2/2016 |
| JP | H08301449 | 11/1996 |
| JP | 2001294303 | 10/2001 |
| JP | 2001317911 | 11/2001 |
| JP | 2003097918 | 4/2003 |
| JP | 2011042498 | 3/2011 |

OTHER PUBLICATIONS

International Application No. PCT/EP2017/062380, International Search Report and Written Opinion dated Sep. 5, 2017.

* cited by examiner

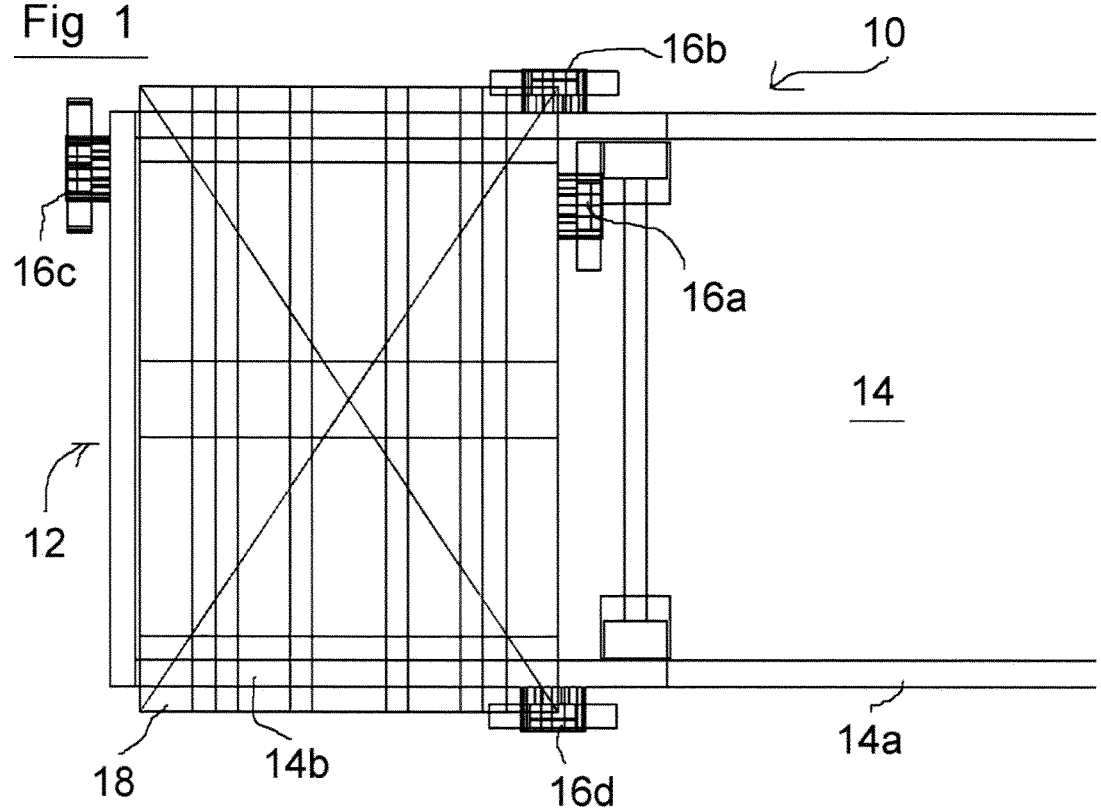
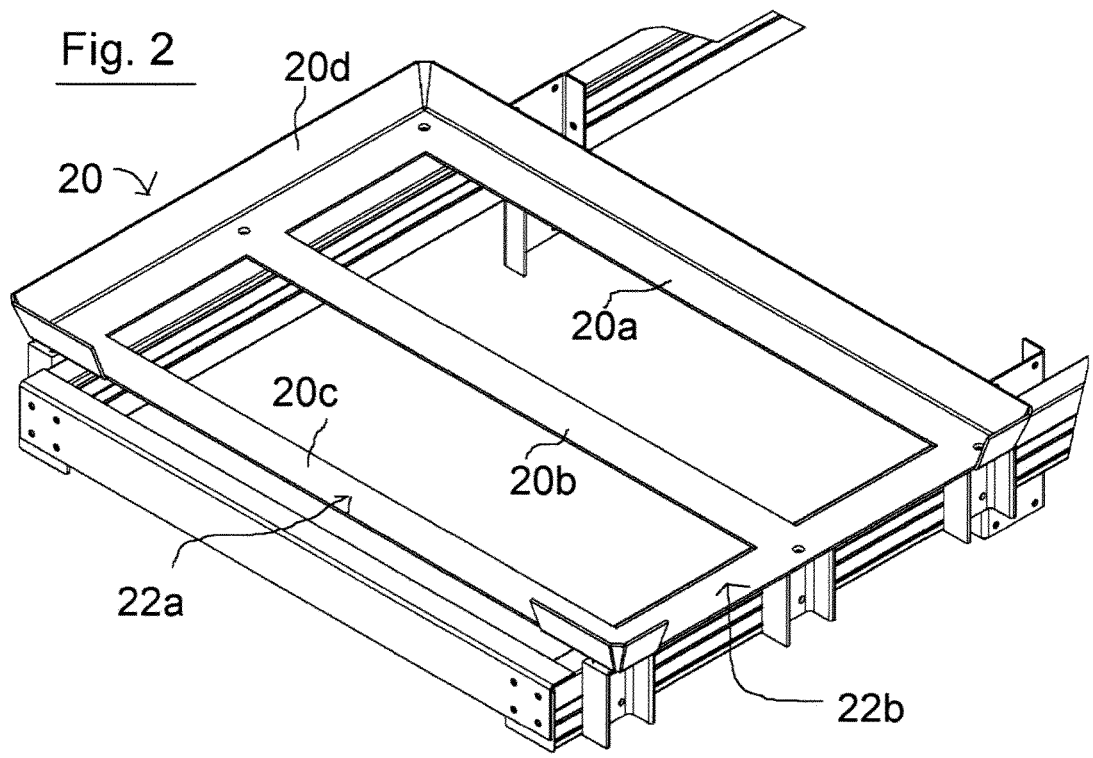

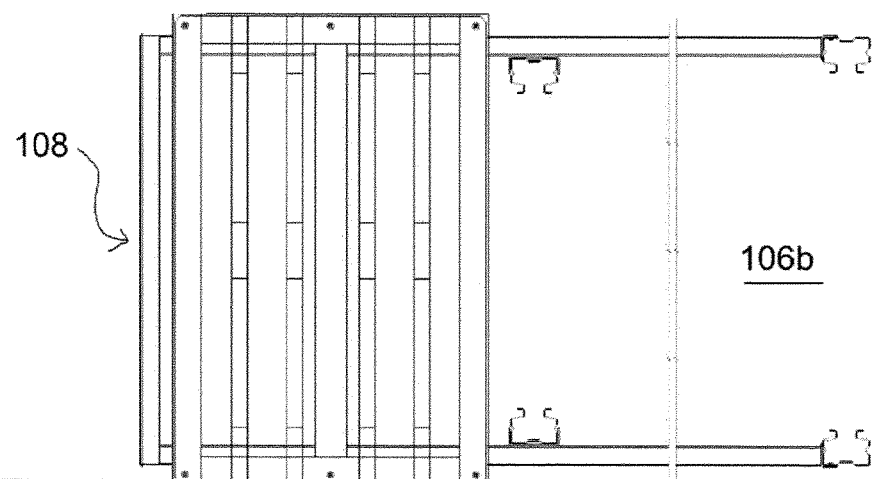
Fig. 5
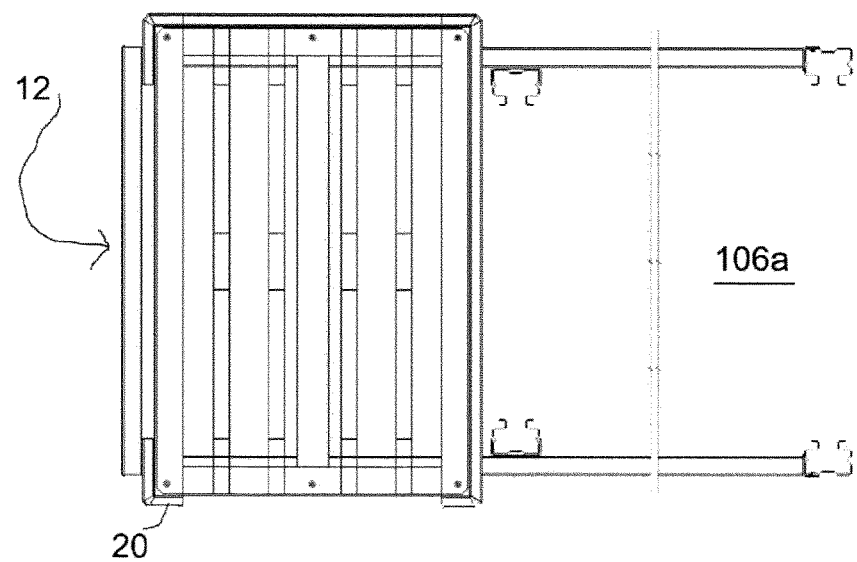
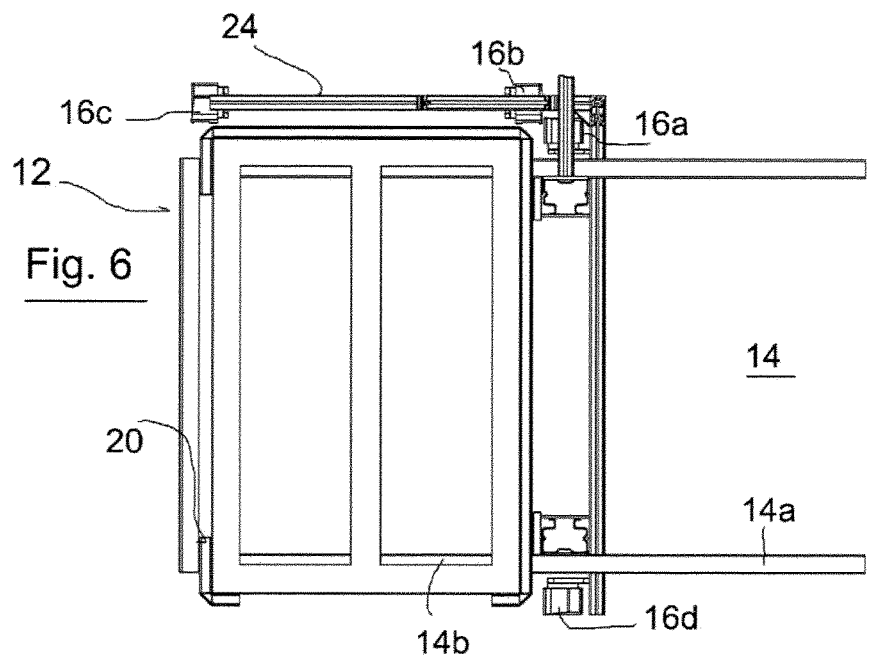
Fig. 6

TRANSFER WITH CONTOUR CHECKING

The present invention relates to an arrangement for checking contours of pallets to be put into storage in a rack system and to a rack system comprising an arrangement of this kind.

When putting pallets into storage in rack systems, in particular in automatic or semi-automatic rack systems, it is of decisive importance that the appropriate pallets and the objects carried by the pallets are located completely within a pre-defined contour. If, namely, this contour should not be maintained, there is a risk of the pallets or the objects carried by the pallets colliding with components of the rack system or other pallets, which could lead to considerable damage and down time.

Further, it is desirable that the contour check is carried out as close as possible to the storage location, i.e. at the rack, in order to reliably ensure that the contour will no longer change before the actual storage. It is likewise desirable that appropriate systems for checking contours can be retrofitted into existing rack systems and that, in particular, no modifications have to be carried out on existing pallet trucks and automated components of rack systems.

For this purpose, DE 10 2014 111 656 A1 for example discloses a device for the camera-based contour-checking of objects, such as loaded pallets for example, in which the objects to be checked are placed on a conveyor belt and transported thereon through a contour frame provided with cameras, wherein the contour of the object is checked in three dimensions by means of the cameras.

However, this contour checking device known from the prior art is relatively expensive and takes up a considerable amount of space, which, particularly with the erection of new rack stores, is likewise reflected in the costs. Further, due to their relatively large size, devices of this kind cannot be retrofitted into existing rack stores or can only be retrofitted with difficulty.

It is therefore the object of the present invention to dispel the disadvantages of known devices for checking contours just mentioned and, in particular, to provide an arrangement which is relatively cost-effective, has a reduced space requirement and can be retrofitted comparatively easily into existing rack systems.

For this purpose, an arrangement according to the invention for checking contours of pallets to be put into storage in a rack system comprises: a pallet transfer station which is designed to receive pallets to be put into storage in the rack system; at least one sensor device which is designed to detect whether a pallet standing on the pallet transfer station and objects carried by the pallet are located completely within a pre-defined contour; and an output unit which is operationally coupled to the sensor unit and is designed to output the detection result.

In the arrangement according to the invention, checking of the contour of the pallet and the objects located thereon is therefore carried out in a state in which the pallet is standing stationary on a pallet transfer station. In this way, the conveyor belt which is required in the prior art can be completely dispensed with, which results in considerable savings relating to both the space for installing the device and its costs. At this point, it should be pointed out that the term "pallet" is not only to be understood strictly in the sense of Euro pallets and the like but can ultimately include all objects which can be transported by a pallet truck and stored in a rack system.

For the actual checking of the contour of the pallet and the objects carried thereby, in the arrangement according to the invention, the at least one sensor device is positioned and aligned with regard to the pallet transfer station such that a possible projection outside the pre-defined contour can be established.

For this purpose, the sensor device can comprise at least one light barrier and/or at least one camera, for example a 3D camera. In particular, known light barriers which can detect an interruption of their pre-set light path or a correspondingly pre-set plane in one or two dimensions can be considered. On the other hand, a three-dimensional image of the pallet and the objects carried thereby can be produced by means of modern camera systems, such as stereo cameras for example, which image can then be checked for compliance with the pre-determined contour by means of pattern recognition algorithms. It is understood that the sensor device can comprise further components for processing and transmitting the acquired data.

In particular, the pre-defined contour can be formed by a polygon, such as a rectangle for example, in plan view on the pallet and, if necessary, additionally, a pre-determined permissible height of the pallet and of the objects carried by the pallet. More particularly, in the case of classical pallets, such as standardised Euro pallets for example, said rectangle can be specified by the outside dimensions of the pallet body itself, i.e. that a projection of objects carried on the pallet outside the perimeter of the pallet body itself is not permissible, wherein tolerances which are to be allowed under certain circumstances can be suitably chosen.

Furthermore, the arrangement according to the invention can comprise means for measuring the weight of the pallet or/and the board clearance of the pallet, which means can likewise be operationally coupled to the output unit. Measuring means which are known per se, such as for example electronic scales and the like, can be provided for this additional optional functionality.

In a development of the arrangement according to the invention, a centring frame, which has a profile tapering towards a set-down area for the pallet, can be associated with the pallet transfer station. By additionally providing the centring frame, it can be ensured that the pallet is located in a pre-determined position and orientation relative to the at least one sensor device, which enables a higher position of the contour check and can therefore enable the use of a less elaborate sensor device. In a particularly simple embodiment, on its underside, the centring frame can have substantially the dimensions of the pallet type provided for the rack system and diverge upwards in the form of a funnel in order to allow the pallet to be placed on the set-down area from above by means of a pallet truck or similar, wherein the funnel shape will ensure that the pallet will come to rest in the position on the set-down area which is intended therefor.

In an embodiment, the arrangement according to the invention can comprise an optical output device which is designed to display the detection result of the sensor unit to an operator of the arrangement, for example the driver of a pallet truck by means of which a pallet is placed on the arrangement according to the invention, wherein the optical output device can preferably be arranged below the pallet transfer station to ensure that the operator has an uninterrupted view of the output device.

Here, in the simplest case, a "digital" output, for example comprising a green and a red lamp, can be considered, which merely indicates to the operator whether or not the pre-defined contour is maintained by the pallet and the objects carried thereon. However, for example, in a development, a display can also be provided in addition, which indicates to the operator the position of a projection outside the pre-defined contour, for example in the form of four further lamps which accordingly represent "front", "back", "left" and "right". Alternatively or in addition, further output devices can also be provided, such as for example audible output devices, which, by means of one or more pre-defined sounds, inform the driver whether or not the pre-defined contour is maintained.

Alternatively or in addition, the output device can also transmit the detection result directly to a superimposed data-processing system, in particular in the context of the rack systems described below.

According to a second aspect, the present invention relates to a rack system comprising at least one rack row, at least one stacker crane and at least one contour checking arrangement according to the invention, the pallet transfer station of which is designed such that pallets can be placed thereon from outside the rack system, which pallets can then be picked up by the stacker crane so as to be stored in the at least one rack row.

In automatic rack systems of this kind, there is a strict separation between an outer area and an automatic area, wherein dedicated transfer stations are provided for storing and retrieving pallets in or from the automatic area, from which transfer stations pallets to be put into storage are collected by the stacker crane and onto which transfer stations pallets to be retrieved from storage are positioned by the stacker crane.

According to the invention, the contour check is therefore carried out at those pallet transfer stations for pallets to be placed into storage. As a result, not only is the pallet transfer station, which is required in any case, simultaneously used in a space-saving manner for checking contours, but also already existing rack systems can be relatively easily retrofitted with a contour checking arrangement according to the invention by installing contour checking arrangements according to the invention at their pallet transfer stations.

Furthermore, this also results in the advantage that, by carrying out the contour check immediately before the automatic area of the rack system, a further contour check on the stacker crane or directly when putting into storage can be dispensed with. Pallets with unsuitable contours can therefore be detected directly after placing on the pallet transfer station and rejected and taken away without having to intervene at any point in the automatic operation of the rack system.

Preferably, in a rack system according to the invention, the pallet transfer station can be provided on a cantilever arm at a longitudinal end of the at least one rack row, which cantilever arm preferably forms an extension of a rack support. Provision in this way of the pallet transfer station on a cantilever arm on the one hand allows simple access to the pallet by both the delivering pallet truck and the stacker crane and, on the other, a suitable support of the weight of the pallet standing on the pallet transfer station.

According to the invention, a plurality of pallet transfer stations can be provided in a rack system according to the invention, in particular on cantilever arms arranged one above the other at a longitudinal end of a single rack row. The possible throughput of pallets to be placed into storage is maximised by this constructional measure.

At the same time, an optical output device can be assigned to each of the plurality of pallet transfer stations. In the case of a plurality of pallet transfer stations arranged one above the other, these optical output devices can, for example, all be arranged below the bottommost of the pallet transfer stations. Alternatively, a single optical output device can also be provided for the plurality of pallet transfer stations, wherein however it must then be ensured by additional means that the instantaneous output of the optical output device corresponds to the detection of the sensor device of the pallet transfer station currently being served.

In particular, in a rack system according to the invention, a first type of rack row, which at a longitudinal end comprises at least one pallet transfer station for pallets to be put into storage, and a second type of rack row, which at an appropriate longitudinal end comprises at least one pallet transfer station for pallets to be retrieved from storage, can be provided, wherein preferably rack rows of the first and second type are arranged alternately. As a result of an arrangement of the two types of rack rows of this kind, the working procedures in the automatic area of the rack system can be optimised, as, after retrieving a pallet from storage, stacker cranes moving between the rows can collect a pallet intended for putting into storage directly from a pallet transfer station opposite.

In a development, in a rack system according to the invention, the output unit can be operationally coupled to a superimposed warehouse management system, as a result of which the contour checking arrangement according to the invention can be integrated in the overall context of the automatic warehouse management system. By this means, it can be ensured, for example automatically, that a transfer of a pallet to be put into storage is carried out by the stacker crane only if the pallet has passed the contour check. On the other hand, the contour check according to the invention can also be integrated in such a way that an operator releases the pallet to be put into storage for the stacker crane manually, for example by means of an input device provided on his pallet truck, when he has received the signal from the output unit that the pre-defined contour is maintained by the appropriate pallet.

Further characteristics and advantages of the present invention will become clear from the following description when considered together with the accompanying drawings. Here, in detail:

FIG. 1 shows a schematic plan view on a contour checking arrangement according to the invention;

FIG. 2 shows a plan view at an angle on a centring frame which can be used in an arrangement according to the invention;

FIG. 5 shows a schematic plan view on two adjacent racks of a rack system according to the invention.

FIG. 6 shows a plan view on a further exemplary embodiment of a contour checking arrangement according to the invention.

Figure 3A:
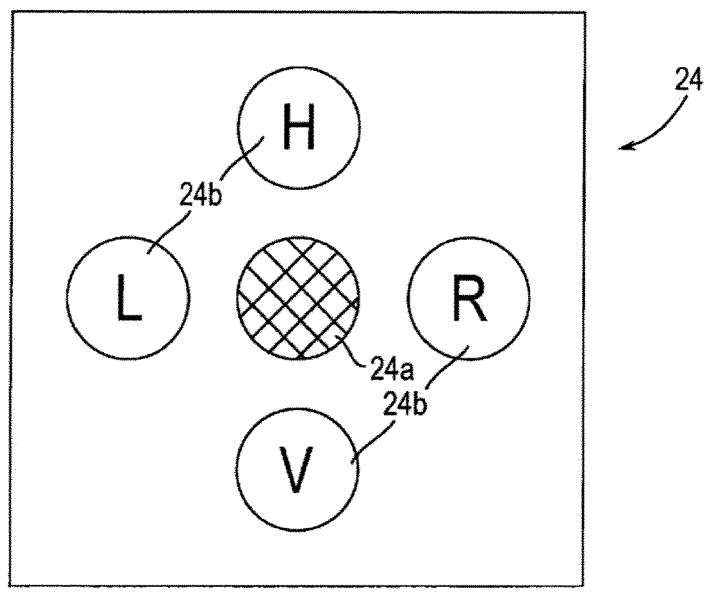
FIGS. 3a and 3b show an embodiment of an optical output device which can be used in an arrangement according to the invention.

A contour checking arrangement according to the invention is shown in a schematic plan view in FIG. 1 and is designated in the most general sense by the reference sign 10. It comprises a pallet transfer station 12, which is provided at one end of a rack row 14 on a cantilever arm 14b in the extension of a rack support 14a. Furthermore, the arrangement comprises a sensor device which in turn comprises four light barriers 16a-16d.

In FIG. 1, a pallet 18, on which a contour check is carried out by means of the light barriers 16a-16d, stands on the pallet transfer station 12. For this purpose, the light barriers 16a-16d span a three-dimension space which forms a pre-defined contour, within which the pallet 18 must be located in order to be able to pass the contour check successfully.

Here, the individual sensors 16a-16d are arranged above the pallet transfer station in the region of a cantilever arm (not shown) of a second rack support which is located above the shown rack support 14a.

FIG. 2 now shows a centring frame 20, which forms the actual set-down area for the pallet on the pallet transfer station 12 from FIG. 1. For this purpose, the centring frame 20 comprises three horizontal parallel beams 20a-20c, which are connected at their longitudinal ends and by means of which said set-down area is formed, and by means of which a suitable weight distribution of the weight of the pallet standing thereon can be ensured. Furthermore, the centring frame 20 comprises a funnel-shaped peripheral projection 20d, which projects at an angle upwards and outwards from the edges of the set-down area formed by the parallel beams 20a-20c and their connections.

Here, the funnel-shaped projection 20d has a first cut-out 22a on a longitudinal side of the centring frame 20 and a second cut-out 22b on a breadth side of the centring frame 20. The first cut-out 22a is provided so that a pallet can be placed in the centring frame from this side by a pallet truck, wherein the cut-out 22a is provided to enable the forks of the pallet truck to set the pallet down. In a similar manner, the second cut out 22b is provided so that, following a successful contour check, a stacker crane can collect the pallet standing in the centring frame from the breadth side of the centring frame 20 in order to subsequently store it in the rack system.

When setting the pallet down in a centring frame 20, which, as mentioned, serves as a pallet transfer station, as a result of the funnel-shaped design of the projection 20d, the pallet can slide down into the funnel-shaped profile under gravity and come to stand exactly in the position which has been pre-determined for it. This enables the subsequent contour check to be carried out with greater precision, as the position of the pallet to be detected is defined and known very accurately.

Figure 3B:
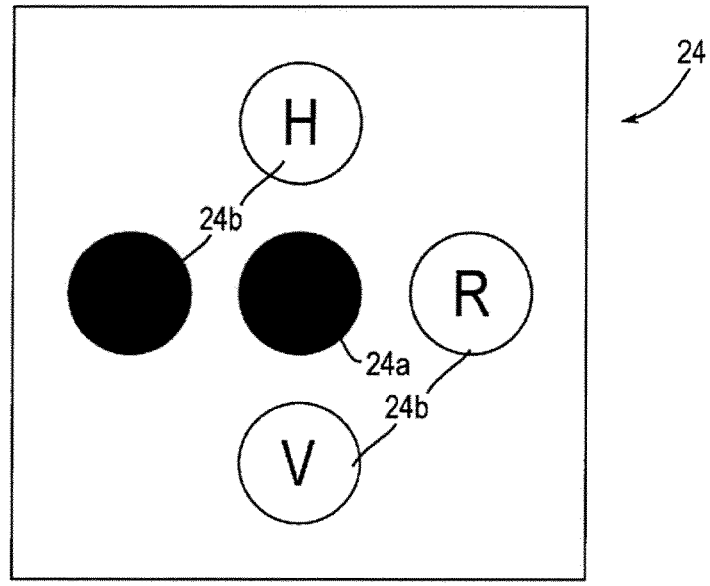

FIGS. 3a and 3b now show a possible embodiment of an optical output device of an contour checking arrangement according to the invention which, in each case, is designated in the most general sense by the reference sign 24.

The optical output device 24 can, for example, be arranged below the pallet transfer station 12 from FIG. 1 in such a way that a driver of a pallet truck, by means of which a pallet is placed on the pallet transfer station 12, has an uninterrupted view thereof. On the one hand, in the central position, it comprises a first element 24a, which comprises two differently coloured lamps and, in the manner of traffic lights, in the first state shown in FIG. 3a illuminates green (indicated by shading) in order to signal that the pallet standing on the pallet transfer station is located completely within the pre-defined contour, while, in the second state shown below, the element 24a illuminates red (shown by infilling) in order to signal that the pallet standing on the pallet transfer station projects beyond or penetrates the pre-defined contour on at least one side.

Further, the second display element 24b, which is equipped with a total of four lamps, which are designated by the letters L, H, R and V, and which in detail stand for "left", "back", "right" and "front", respectively, is provided in order to facilitate localisation of the projection of the pallet beyond the contour. In the state shown in FIG. 3b, the pallet standing on the pallet transfer station penetrates the pre-defined contour on the left-hand side, so that the lamp designated by L illuminates red together with the first element 24a. The second element 24b will make it considerably easier for the operator of the arrangement according to the invention to find the projection of the pallet, thus allowing the removal of the projection to also proceed more quickly.

Figure 4:
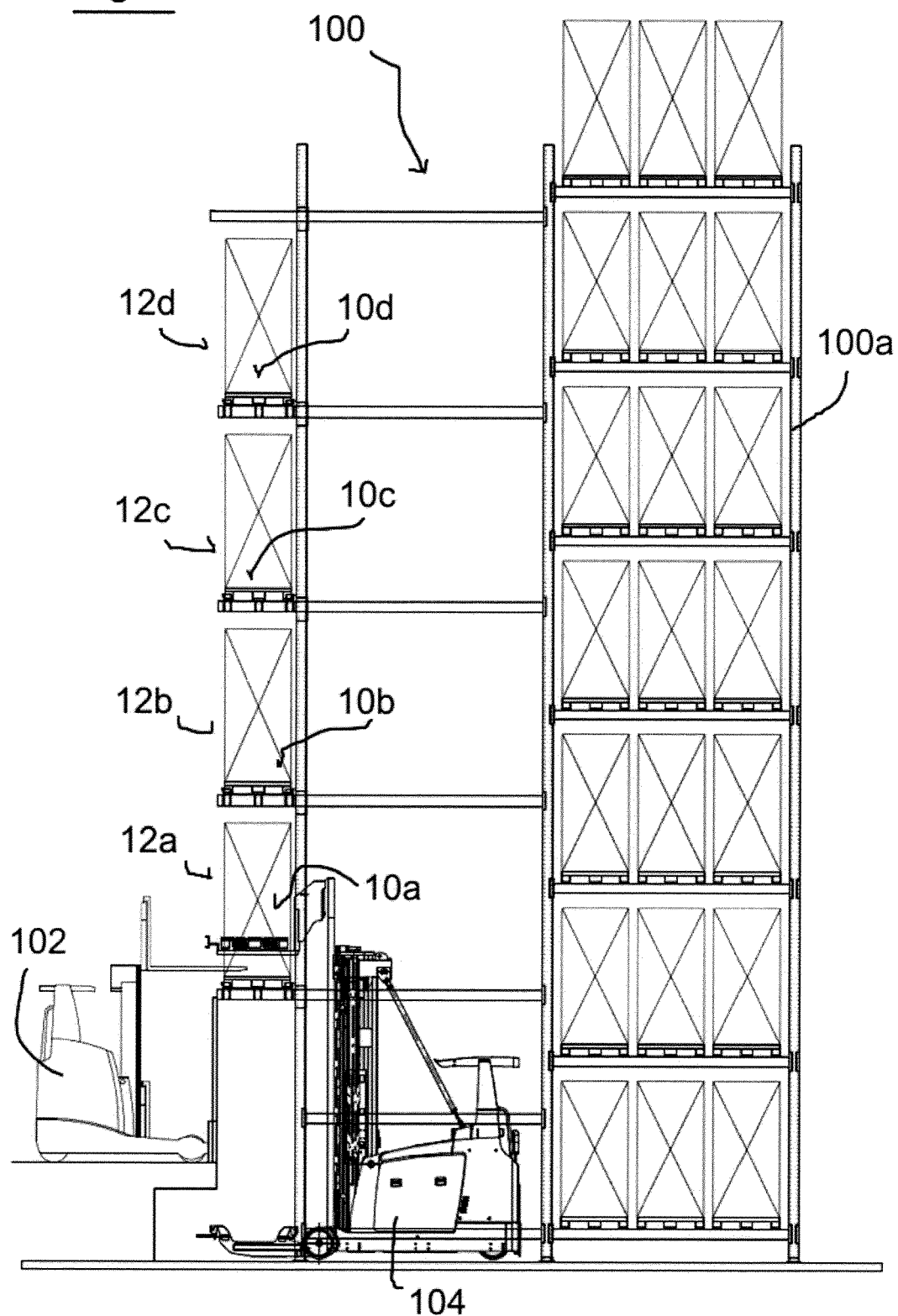
FIG. 4 shows a schematic side view of a rack row of a rack system according to the invention having a plurality of pallet transfer stations arranged one above the other.

A rack row of a rack system according to the invention as well as a pallet truck, which supplies pallets to be put into storage, and a stacker crane, which puts the supplied pallets into storage, is now shown schematically in side view in FIG. 4. Here, the rack system as a whole is designated by the reference sign 100, the pallet truck by the reference sign 102, and the stacker crane, which for its part forms part of the rack system, by the reference sign 104.

As can also be seen, located on the end face of the rack row 100a, which forms part of the rack system 100, are four pallet transfer stations 12a-12d, which are each part of a contour checking arrangement 10a-10d according to the invention, wherein for reasons of clarity a depiction of the respective sensor units has been dispensed with. The pallets are now put into storage in that the pallet truck 102 takes a pallet from goods receiving or from an intermediate store and places it on one of the pallet transfer stations 12a-12d. On this pallet transfer station, by means of the respectively associated contour checking arrangement 10a-10d, the contour check described with reference to FIG. 1 is then carried out by means of the respective sensor devices, wherein the driver of the pallet truck 102 is informed, for example by means of a plurality of output devices of the type shown in FIGS. 3a and 3b, which are associated with the respective arrangements 10a-10d, and which, as mentioned, can be located below the bottommost pallet transfer station 12a, whether the respective pallet successfully passes the contour check or whether there is an inadmissible projection.

Depending on the result of the detection, the pallet is then released for putting into storage in the rack system 100 by the stacker crane 104, or it must be removed from the pallet transfer station 12a-12d by the driver of the pallet truck 102 in order to be able to remove the projection of the pallet on the ground. In doing so, the release of the pallet for putting into storage by the stacker crane 104 can be carried out either automatically by transmitting the sensor data from the output unit of the particular contour checking arrangement 10a-10d to a superimposed warehouse management system, or manually by the driver of the pallet truck 102 based on the detection result of the sensor unit displayed to him by the optical output device.

Two adjacent rack rows of the rack system 100 from FIG. 4 are shown in schematic plan view in FIG. 5 and designated by 106a and 106b. Here, a pallet transfer station 12 for pallets to be put into storage, with which an arrangement for checking contours (not shown) is associated and which comprises a centring frame 20 as shown in FIG. 2, is associated with the rack row 106a shown at the bottom. In contrast to this, a pallet transfer station 108 for pallets to be retrieved from storage is associated with the second rack row 106b shown at the top in which the centring frame 20 has been omitted, as, at this point, for retrieving a pallet from storage, it does not have to be positioned with the same precision as is necessary for the contour check described above.

As the adjacent rack rows are arranged alternately with pallet transfer stations 12 for pallets to be put into storage and pallet transfer stations 108 for pallets to be retrieved from storage, the working procedures in the automatic area of the rack system 100 can be optimised in such a way that, after retrieving a pallet on the pallet transfer station 108, the stacker crane, which is not shown in FIG. 5, straightaway collects a pallet to be put into storage from the pallet transfer station 12 directly opposite. This enables the distances covered by the stacker crane to be minimised, which leads to an optimum usage of resources.

FIG. 6 shows an arrangement for checking contours of a loaded pallet which has been modified compared with the arrangement according to FIG. 1.

Characteristics which functionally or objectively correspond to characteristics of the exemplary embodiment explained above are designated in FIG. 6 by appropriately corresponding reference signs, so that in order to explain the arrangement according to FIG. 6 only differences from the example already described are pointed out. In the exemplary embodiment according to FIG. 6, the sensors (light barriers 16a-16d) are not fitted directly to the rack but to a separate mounting device 24. This has the advantage that, when placing a pallet on the cantilever arm 14b, the sensors 16a-16d are extensively decoupled from the cantilever arm 14b and the rack from the point of view of vibration. The arrangement according to FIG. 6 can be used as transfer station 12.

The invention claimed is:

1. Arrangement for checking contours of pallets to be put into storage in a rack system, comprising:
    a pallet transfer station, wherein the pallet transfer station receives pallets to be put into storage in the rack system;
    at least one sensor device configured to detect whether a pallet of the pallets that is positioned on a set-down area of the pallet transfer station and objects carried by the pallet are located completely within a pre-defined contour; and
    an output unit operationally coupled to the at least one sensor device and to output a result of the detection; and
    a centring frame for positioning the pallet on the set-down area, the centring frame having a profile tapering towards the set-down area of the pallet transfer station, the centring frame comprising a funnel-shaped peripheral projection projecting at an angle upwards and outwards from edges of the set-down area.

2. The arrangement of claim 1, wherein the sensor device comprises at least one of a light barrier or a camera.

3. The arrangement of claim 1, wherein the pre-defined contour is formed by a polygon in plan view on the pallet.

4. The arrangement of claim 1, further comprising means for measuring at least one of a weight of the pallet or a board clearance of the pallet, wherein said means are operationally coupled to the output unit.

5. The arrangement of claim 1, wherein the output unit comprises an optical output device which is designed to display the result of the detection to an operator.

6. A rack system, comprising:
    at least one rack row;
    at least one stacker crane; and
    at least one contour checking arrangement for checking contours of pallets to be put into storage in the rack system, wherein the contour checking arrangement comprises:
        at least one pallet transfer station, wherein the at least one pallet transfer station receives pallets to be put into storage in the rack system;
        at least one sensor device configured to detect whether a pallet of the pallets that is positioned on the pallet transfer station and objects carried by the pallet are located completely within a pre-defined contour;
        at least one optical output unit operationally coupled to the at least one sensor device and to output a result of the detection; and
        a centring frame having a profile tapering towards a set-down area for the pallet, the centring frame comprising a funnel-shaped peripheral projection projecting at an angle upwards and outwards from edges of the set-down area,
    wherein the pallets can be picked up from the at least one pallet transfer station by the stacker crane and put into storage.

7. The rack system of claim 6, wherein the at least one pallet transfer station is provided on a cantilever arm at a longitudinal end of the at least one rack row.

8. The rack system of claim 6, wherein the at least one pallet transfer station comprises a plurality of pallet transfer stations, each pallet transfer station of the plurality of pallet transfer stations being provided on a respective cantilever arm, wherein the respective cantilever arms are arranged one above the other at a longitudinal end of a single rack row of the at least one rack row.

9. The rack system of claim 8, wherein a respective optical output unit of the at least one optical output unit is assigned to each of the plurality of pallet transfer stations.

10. The rack system of claim 9, wherein the respective optical output units assigned to each of the plurality of pallet transfer stations are all arranged below a bottom most pallet transfer station.

11. The rack system of claim 6, wherein the at least one pallet transfer station comprises a plurality of pallet transfer stations, and wherein:
    a first type of rack row which at a longitudinal end thereof comprises one or more of the plurality of pallet transfer stations; and
    a second type of rack row which at a longitudinal end thereof comprises one or more of the plurality of pallet transfer stations.

12. The rack system of claim 6, wherein the output unit is operationally coupled to a superimposed warehouse management system.

13. The arrangement of claim 1, wherein the sensor device comprises a 3D camera.

14. The arrangement of claim 1, wherein the output unit is arranged below the pallet transfer station.

15. The arrangement of claim 3, wherein the polygon is configured to ensure that the pallet and the objects carried by the pallet have a height that is less than pre-determined permissible height.

16. The rack system of claim 7, wherein the cantilever arm forms an extension of a rack support.

17. The rack system of claim 11, wherein rack rows of the first and second type are arranged alternately.

18. A rack system, comprising:
    at least one rack row;
    at least one stacker crane; and
    at least one contour checking arrangement for checking contours of pallets to be put into storage in the rack system, wherein the contour checking arrangement comprises:
        at least one pallet transfer station, wherein the at least one pallet transfer station receives pallets to be put into storage in the rack system;
        at least one sensor device configured to detect whether a pallet of the pallets that is positioned on the pallet transfer station and objects carried by the pallet are located completely within a pre-defined contour;
        at least one optical output unit operationally coupled to the at least one sensor device and to output a result of the detection; and a centring frame having a profile tapering towards a set-down area for the pallet, wherein the pallets can be picked up from the at least one pallet transfer station by the stacker crane and put into storage, wherein the at least one pallet transfer station comprises a plurality of pallet transfer stations, each pallet transfer station of the plurality of pallet transfer stations being provided on a respective cantilever arm, wherein the respective cantilever arms are arranged one above the other at a longitudinal end of a single rack row of the at least one rack row, and wherein a respective optical output unit of the at least one optical output unit is assigned to each of the plurality of pallet transfer stations.

19. A rack system, comprising:

at least one rack row;

at least one stacker crane; and at least one contour checking arrangement for checking contours of pallets to be put into storage in the rack system, wherein the contour checking arrangement comprises:

at least one pallet transfer station, wherein the at least one pallet transfer station receives pallets to be put into storage in the rack system;

at least one sensor device configured to detect whether a pallet of the pallets that is positioned on the pallet transfer station and objects carried by the pallet are located completely within a pre-defined contour;

at least one optical output unit operationally coupled to the at least one sensor device and to output a result of the detection; and a centring frame having a profile tapering towards a set-down area for the pallet, wherein the pallets can be picked up from the at least one pallet transfer station by the stacker crane and put into storage, wherein the at least one pallet transfer station comprises a plurality of pallet transfer stations, each pallet transfer station of the plurality of pallet transfer stations being provided on a respective cantilever arm, wherein the respective cantilever arms are arranged one above the other at a longitudinal end of a single rack row of the at least one rack row, wherein a respective optical output unit of the at least one optical output unit is assigned to each of the plurality of pallet transfer stations, and wherein the respective optical output units assigned to each of the plurality of pallet transfer stations are all arranged below a bottom most pallet transfer station.

20. A rack system, comprising:

at least one rack row;

at least one stacker crane; and at least one contour checking arrangement for checking contours of pallets to be put into storage in the rack system, wherein the contour checking arrangement comprises:

at least one pallet transfer station, wherein the at least one pallet transfer station receives pallets to be put into storage in the rack system;

at least one sensor device configured to detect whether a pallet of the pallets that is positioned on the pallet transfer station and objects carried by the pallet are located completely within a pre-defined contour;

at least one optical output unit operationally coupled to the at least one sensor device and to output a result of the detection; and a centring frame having a profile tapering towards a set-down area for the pallet, wherein the pallets can be picked up from the at least one pallet transfer station by the stacker crane and put into storage, wherein the at least one pallet transfer station comprises a plurality of pallet transfer stations, and wherein:

a first type of rack row which at a longitudinal end thereof comprises one or more of the plurality of pallet transfer stations; and a second type of rack row which at a longitudinal end thereof comprises one or more of the plurality of pallet transfer stations.

* * * * *